(12) United States Patent
Hama

(10) Patent No.: US 11,407,884 B2
(45) Date of Patent: Aug. 9, 2022

(54) RESIN COMPOSITION AND FILM COMPRISING IT

(71) Applicant: TOSOH CORPORATION, Shunan (JP)

(72) Inventor: Shimpei Hama, Yokkaichi (JP)

(73) Assignee: TOSOH CORPORATION, Shunan (JP)

(*) Notice: Subject to any disclaimer, the term of this patent is extended or adjusted under 35 U.S.C. 154(b) by 295 days.

(21) Appl. No.: 16/497,008

(22) PCT Filed: Mar. 27, 2018

(86) PCT No.: PCT/JP2018/012322
§ 371 (c)(1),
(2) Date: Sep. 24, 2019

(87) PCT Pub. No.: WO2018/181260
PCT Pub. Date: Oct. 4, 2018

(65) Prior Publication Data
US 2020/0095405 A1    Mar. 26, 2020

(30) Foreign Application Priority Data

Mar. 28, 2017 (JP) .............................. JP2017-063422

(51) Int. Cl.
*C08L 23/06* (2006.01)
*C08L 45/00* (2006.01)

(52) U.S. Cl.
CPC ............. *C08L 23/06* (2013.01); *C08L 45/00* (2013.01); *C08L 2203/16* (2013.01); *C08L 2207/062* (2013.01)

(58) Field of Classification Search
CPC ............... C08L 23/06; C08L 2203/16; C08L 2207/062; C08L 45/00
See application file for complete search history.

(56) References Cited

U.S. PATENT DOCUMENTS

| | | |
|---|---|---|
| 2014/0147666 A1 | 5/2014 | Sakamoto et al. |
| 2015/0344647 A1 | 12/2015 | Maeda et al. |

FOREIGN PATENT DOCUMENTS

| | | |
|---|---|---|
| JP | 08-192871 A | 7/1996 |
| JP | 2000-070331 A | 3/2000 |
| JP | 2005-162965 A | 6/2005 |
| JP | 2005162965 A * | 6/2005 |
| JP | 2009-138029 A | 6/2009 |
| JP | 2009-248973 A | 10/2009 |
| JP | 5330240 B2 | 10/2013 |
| JP | 2014-195609 A | 10/2014 |
| JP | 2014-196438 A | 10/2014 |
| WO | 2012/035956 A1 | 3/2012 |
| WO | 2014/103988 A1 | 7/2014 |

OTHER PUBLICATIONS

International Preliminary Report on Patentability (PCT/IB/373) with translation of Written Opinion dated Oct. 1, 2019 (PCT/ISA/237), in International Application No. PCT/JP2018/012322.
International Search Report of PCT/JP2018/012322 dated Jun. 19, 2018 (PCT/ISA/210).
Written Opinion of PCT/JP2018/012322 dated Jun. 19, 2018 (PCT/ISA/237).

* cited by examiner

*Primary Examiner* — Robert D Harlan
(74) *Attorney, Agent, or Firm* — Sughrue Mion, PLLC

(57) ABSTRACT

To provide a resin composition comprising a cyclic polyolefin and an ethylene polymer, having excellent impact resistance and having high transparency maintained.

A resin composition comprising from 5 to 95 parts by weight of a cyclic polyolefin (A) and from 5 to 95 parts by weight of an ethylene polymer (B) which satisfies the following requirements (a) to (d) (the total amount of (A) and (B) is 100 parts by weight):

(a) the density is from 930 to 960 kg/m$^3$;
(b) MFR is from 0.1 to 15.0 g/10 min;
(c) in molecular weight measurement by gel permeation chromatography, two peaks are observed, and the ratio (Mw/Mn) of the weight average molecular weight (Mw) to the number average molecular weight (Mn) is within a range of from 3.0 to 7.0; and
(d) a fraction having Mn of at least 100,000 as obtained by molecular weight fractionation, has at least 0.15 long-chain branches per 1,000 carbon atoms of the main chain.

12 Claims, 1 Drawing Sheet

RESIN COMPOSITION AND FILM COMPRISING IT

CROSS REFERENCE TO RELATED APPLICATIONS

This application is a National Stage of International Application No. PCT/JP2018/012322 filed Mar. 27, 2018, claiming priority based on Japanese Patent Application No. 2017-063422 filed Mar. 28, 2017, the contents of all of which are incorporated herein by reference in their entirety.

TECHNICAL FIELD

The present invention relates to a resin composition and a film comprising it. More particularly, it relates to a resin composition and a film comprising it, suitable for a medical film and member and a food film and member used for infusion solutions and food packaging.

BACKGROUND ART

A medical film and member for packaging a chemical solution, blood, etc., and a food film for packaging food are required to have transparency for visual confirmation of presence or absence of foreign matters, and further a property to prevent loss of effects of active ingredients in a solution or content in it.

Heretofore, for a medical film and a food film which satisfy such performance, a polyolefin resin or a cyclic polyolefin resin has been used, however, a film formed only from a cyclic polyolefin, which has a glass transition temperature of at least room temperature, has problems such that it may be cracked by impact, which should be solved in view of impact resistance.

Accordingly, as a material of a film, resin compositions comprising a cyclic polyolefin, and a linear polyolefin such as a polyethylene or a polypropylene or a styrene block copolymer, an isobutylene copolymer or the like blended have been developed, and a medical film using a resin composition comprising a cyclic polyolefin, a linear polyolefin and the like has been proposed (for example, Patent Documents 1 to 4).

A film comprising a resin composition of a cyclic polyolefin resin and a polyethylene resin has problems such that transparency or the like decreases. Further, a film comprising a resin composition of a cyclic polyolefin and a polypropylene has problems such that impact resistance at low temperature decreases. On the other hand, a film comprising a resin composition of a cyclic polyolefin resin and a styrene block copolymer, an isobutylene copolymer or the like, has problems such that the cost of the film increases. Accordingly, development of a resin which has improved impact resistance of a cyclic polyolefin resin has been desired.

Further, in recent years, in a medical container field, a multi-chamber container capable of separate storage of a plurality of components and of mixing treatment of the plurality of components in the container immediately before use has been widely used. It is important that such a multi-chamber container has an easily releasable sealing property imparted, with a wide heat sealing temperature range capable of forming an easily releasable sealed portion for separating adjacent compartments.

In order to impart an easily releasable sealing property, a multilayer film has been proposed. A multilayer film is required to be designed to satisfy various physical properties such as an easily releasable sealing property, transparency and heat resistance against heat sterilization.

As such a multilayer film and a container using it, Patent Document 2 discloses a medical multi-chamber container comprising a composition containing a cyclic polyolefin and a linear polyolefin for a sealant layer.

Further, Patent Document 3 discloses a medical multi-chamber container comprising a composition containing a cyclic polyolefin and a block copolymer constituted by a vinyl aromatic hydrocarbon polymer block (a) and a vinyl aromatic hydrocarbon/hydrogenated conjugated diene copolymer block (b) and having a structure represented by (a)-(b)-(a), for a sealant layer.

Patent Document 4 discloses a medical multi-chamber container using a composition containing a cyclic polyolefin and a block copolymer of a styrene polymer block and an isobutylene polymer block for a sealant layer.

Patent Document 5 discloses a medical fluid bag using a composition comprising two types of linear low density polyethylenes differing in the density for a sealant layer.

Patent Document 6 discloses a medicine container using a composition comprising a linear polyethylene and a propylene homopolymer for a sealant layer.

A film comprising a resin composition of a cyclic polyolefin resin and a polyethylene resin has problems such that transparency or the like decreases. Further, a film comprising a resin composition of a cyclic polyolefin resin and a vinyl aromatic hydrocarbon polymer, a styrene block copolymer, an isobutylene copolymer or the like has problems such that the cost of the film increases. On the other hand, a film comprising a resin composition of two types of linear low density polyethylenes differing in the density has problems such as insufficient heat resistance against heat sterilization. Further, a film comprising a resin composition comprising a linear polyethylene and a propylene homopolymer has problems such as insufficient transparency. Accordingly, development of a resin having an easily releasable sealing property has been desired.

PRIOR ART DOCUMENTS

Patent Documents

Patent Document 1: JP-A-H08-192871
Patent Document 2: JP-A-2000-70331
Patent Document 3: JP-A-2014-195609
Patent Document 4: JP-A-2014-196438
Patent Document 5: JP-A-2009-248973
Patent Document 6: Japanese Patent No. 5330240

DISCLOSURE OF INVENTION

Technical Problem

It is an object of the present invention to provide a resin composition comprising a cyclic polyolefin and an ethylene polymer, having excellent impact resistance which a medical or food film comprising a cyclic polyolefin resin lacks, and having high transparency maintained, and a film comprising it.

Another object of the present invention is to provide a resin composition comprising a cyclic polyolefin and an ethylene polymer, having an easily releasable sealing property required for an inner layer of a multilayer film, a film comprising the resin composition, and a film using the resin composition for a sealant layer of a multilayer film.

Solution to Problem

The present inventor has conducted extensive studies and as a result, found that the above object can be achieved by using a resin composition comprising a cyclic polyolefin resin and a specific amount of a polyethylene resin having specific physical properties blended, and accomplished the present invention.

That is, the present invention resides in the following [1] to [12].

[1] A resin composition comprising from 5 to 95 parts by weight of a cyclic polyolefin (A) and from 5 to 95 parts by weight of an ethylene polymer (B) which satisfies the following requirements (a) to (d) (the total amount of (A) and (B) is 100 parts by weight):
(a) the density as measured by density gradient tube method in accordance with JIS K6922-1 is from 930 to 960 kg/m$^3$;
(b) the melt mass flow rate (hereinafter referred to as MFR) as measured in accordance with JIS K6922-1 at 190° C. under a load of 21.18 N is from 0.1 to 15 g/10 min;
(c) in molecular weight measurement by gel permeation chromatography (hereinafter referred to as GPC), two peaks are observed, and the ratio (Mw/Mn) of the weight average molecular weight (Mw) to the number average molecular weight (Mn) is within a range of from 3.0 to 7.0; and
(d) a fraction having Mn of at least 100,000 as obtained by molecular weight fractionation, has at least 0.15 long-chain branches having at least 6 carbon atoms per 1,000 carbon atoms of the main chain.

[2] The resin composition according to the above [1], which comprises from 10 to 90 parts by weight of the cyclic polyolefin resin (A) and from 10 to 90 parts by weight of the ethylene polymer (B).

[3] The resin composition according to the above [1], which comprises from 20 to 40 parts by weight of the cyclic polyolefin (A) and from 60 to 80 parts by weight of the ethylene polymer (B).

[4] The resin composition according to any one of the above [1] to [3], wherein of the ethylene polymer (B), Mw/Mn is within a range of from 3.0 to 6.0, and Mn is at least 15,000.

[5] The resin composition according to any one of the above [1] to [4], wherein the proportion of a component having Mn of at least 100,000 as obtained by molecular weight fractionation of the ethylene polymer (B), is less than 40% of the entire ethylene polymer (B).

[6] The resin composition according to any one of the above [1] to [5], which further contains from 20 to 300 parts by weight of a high density polyethylene (C) which satisfies the following requirements (e) to (g) per 100 parts by weight of the cyclic polyolefin resin (A) and the ethylene polymer (B):
(e) the density as measured by density gradient tube method in accordance with JIS K6922-1 is from 940 to 970 kg/m$^3$;
(f) MFR as measured in accordance with JIS K6922-1 at 190° C. under a load of 21.18 N is from 0.1 to 15.0 g/10 min;
(g) a fraction having Mn of at least 100,000 as obtained by molecular weight fractionation has at most 0.14 long-chain branches having at least 6 carbon atoms per 1,000 carbon atoms of the main chain.

[7] The resin composition according to the above [6], which contains from 80 to 150 parts by weight of the high density polyethylene (C) per 100 parts by weight of the cyclic polyolefin resin (A) and the ethylene polymer (B).

[8] A resin composition comprising from 20 to 40 parts by weight of a cyclic polyolefin (A) and from 60 to 80 parts by weight of a high density polyethylene (C) which satisfies the following requirements (e) to (g) (the total amount of (A) and (C) is 100 parts by weight):
(e) the density as measured by density gradient tube method in accordance with JIS K6922-1 is from 940 to 970 kg/m$^3$;
(f) MFR as measured in accordance with JIS K6922-1 at 190° C. under a load of 21.18 N is from 0.1 to 15.0 g/10 min;
(g) a fraction having Mn of at least 100,000 as obtained by molecular weight fractionation has at most 0.14 long-chain branches having at least 6 carbon atoms per 1,000 carbon atoms of the main chain.

[9] The resin composition according to the above [8], which comprises from 30 to 40 parts by weight of the cyclic polyolefin resin (A) and from 60 to 70 parts by weight of the high density polyethylene (C).

[10] The resin composition according to any one of the above [6] to [9], wherein of the high density polyethylene (C), Mw/Mn is within a range of from 2.0 to 3.5, and Mn is at least 25,000.

[11] A film comprising the resin composition according to any one of the above [1] to [10]. [12] A film using the film as defined in the above [11] for a sealant layer.

Now, the cyclic polyolefin resin, the polyethylene resin, the resin composition and the film comprising it of the present invention will be described.

[I] Cyclic Polyolefin (A)

The cyclic polyolefin (A) used in the present invention contains a cyclic olefin component as a polymer component and is not particularly limited so long as it is a polyolefin resin containing the cyclic olefin component in its main chain. It may, for example, be a polymer having repeating units represented by the following formula (1) (hereinafter sometimes referred to as "polymer (1)" and/or a polymer having repeating units represented by the following formula (2) (hereinafter sometimes referred to as "polymer (2)").

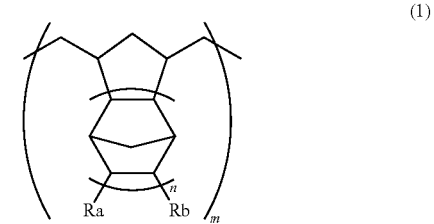

(1)

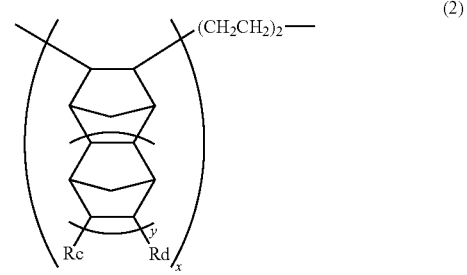

(2)

(In the above formula (1), Ra and Rb which may be the same or different, are a hydrogen atom or an organic group, and Ra and Rb may be mutually bonded to form a ring. m is an integer of at least 1, and n is an integer of at least 0.

In the above formula (2), Rc and Rd which may be the same or different, are a hydrogen atom or an organic group, and Rc and Rd may be mutually bonded to form a ring. x and z are each an integer of at least 1, and y is an integer of at least 0.)

The organic group as each of Ra, Rb, Rc and Rd may be a $C_{1-8}$ hydrocarbon residue, or a polar group such as halogen, ester, nitrile or pyridyl.

The polymer (1) is a hydrogenated ring-opened metathesis polymer of an unsaturated cyclic olefin monomer, and the unsaturated cyclic olefin monomer may, for example, be a monocyclic cycloolefin or its derivative having a substituent, such as cyclobutene, cyclopentene, cyclooctene or cyclododecene, or a substituted or non-substituted bicyclic, tricyclic or more polycyclic olefin monomer having a norbornene ring (hereinafter sometimes referred to as norbornene monomer). From the viewpoint of production suitability and content suitability, a norbornene monomer is particularly suitably used.

On the other hand, the polymer (2) is a copolymer of ethylene and a norbornene monomer.

The norbornene monomer constituting the polymer (1) and the polymer (2) may, for example, be more specifically a bicyclic cycloolefin such as a norbornene, norbornadiene, methylnorbornene, dimethylnorbornene, ethylnorbornene, chlorinated norbornene, chloromethylnorbornene, trimethylsilylnorbornene, phenylnorbornene, cyanonorbornene, dicyanonorbornene, methoxycarbonylnorbornene, pyridyl norbornene, nadic anhydride or nadic acid imide; a tricyclic cycloolefin such as dicyclopentadiene, dihydrodicyclopentadiene or its alkyl, alkenyl, alkylidene or aryl substitution product; a tetracyclic cycloolefin such as dimethanohexahydronaphthalene, dimethanooctahydronaphthalene or its alkyl, alkenyl, alkylidene or aryl substitution product; a pentacyclic cycloolefin such as tricyclopentadiene; or a hexacyclic cycloolefin such as hexacycloheptadecene. Further, dinorbornene, a compound having two norbornene rings bonded by a hydrocarbon chain, an ester group or the like, or a compound containing norbornene rings, such as its alkyl or aryl substitution product may, for example, be used.

The method for producing the polymer (1) is not particularly limited and various known production methods may be employed. The polymer (1) may be produced, for example, by subjecting the above unsaturated cyclic olefin monomer, preferably the norbornene monomer, to ring-opening polymerization, and hydrogenating the olefinic unsaturated bond moiety in the formed polymer, The ring-opening polymerization may be carried out, for example, by subjecting an unsaturated cyclic olefin monomer to ring-opening polymerization in a catalyst system containing a transition metal compound or a platinum metal compound and an organic metal compound such as an organic aluminum compound, in the case of an additive such as an aliphatic or aromatic tertiary amine as the case requires, at a temperature within a range of from −20 to 100° C. under a pressure within a range of from 0.01 to 50 kg/cm$^2$G. Further, hydrogenation may be carried out in the presence of a conventional hydrogenation catalyst.

The polymer (1) may have a plural types of repeating units differing in the structure as the repeating units represented by the formula (1). It preferably has, as the repeating units represented by the formula (1), repeating units represented by the following formula (3), more specifically, it preferably has at least 30 mol % of the repeating units represented by the following formula (3) in its molecule.

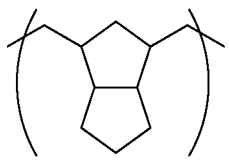

(3)

The ratio of ethylene to the norbornene monomer as monomer components contained in the polymer (2) is, by the molar ratio of ethylene/norbornene monomer, preferably within a range of ethylene/norbornene monomer of from 80/20 to 30/70. The lower the ethylene ratio within this range, the higher the glass transition temperature and the more excellent the heat resistance of the polymer (2) tend to be, and the higher the ethylene ratio within this range, the more favorable the forming property of the polymer (2) tends to be, and the more excellent the toughness tends to be.

The method for producing the polymer (2) is not particularly limited, and various known production methods may be employed. The polymer (2) may be produced, for example, by copolymerizing ethylene and the norbornene monomer in a liquid phase. The copolymerization in the liquid phase may be carried out, for example, in the presence of a catalyst comprising a soluble vanadium compound and an organic aluminum compound, in a hydrocarbon solvent such as cyclohexane, at a temperature within a range of from −50 to 100° C. under a pressure within a range of from 0.01 to 50 kg/cm$^2$G.

The number average molecular weight and the limiting viscosity number of the cyclic polyolefin (A) are not particularly limited and may be suitably selected depending upon the application, etc., and usually, it is preferred that the number average molecular weight is within a range of from 10,000 to 500,000, or the limiting viscosity number measured in decalin at 135° C. is within a range of from 0.01 to 20 dL/g. When the number average molecular weight or the limiting viscosity number of the cyclic polyolefin (A) is preferably at most the above upper limit value from the viewpoint of forming property, and it is preferably at least the above lower limit value from the viewpoint of toughness. When the cyclic polyolefin (A) has MFR of from 10 to 30 g/10 min in accordance with ASTM D1238 (260° C., 21.18 N), MFR of from 10 to 60 g/10 min in accordance with ISO 1133 (280° C., 21.2 N) or MVR or from 10 to 60 cm$^3$/10 min in accordance with ISO 1133 (230° C., 21.18 N), the number average molecular weight or the limiting viscosity number is within the above range.

Such a cyclic polyolefin (A) may be available as a commercial product, and as the polymer (1), for example, "Zeonex (registered trademark)" and "Zeonor (registered trademark)", trade names, manufactured by Zeon Corporation, and "ARTON (registered trademark)", trade name, manufactured by JSR Corporation may be mentioned.

Further, as the polymer (2), for example, "APEL (registered trademark)" manufactured by Mitsui Chemicals, Inc. and "TOPAS (registered trademark)" manufactured by TOPAS Advanced Polymers may be mentioned.

In the present invention, as the cyclic polyolefin (A), one type of the polymer (1) may be used, or two or more types may be used in combination. Further, only one type of the polymer (2) may be used, or two or more types may be used in combination. Further, one or two or more types of the polymer (1) and one or two or more types of the polymer (2) may be used in combination.

[II] Ethylene Polymer (B)

The ethylene polymer (B) used in the present invention may, for example, be a polymer such as an ethylene homopolymer or an ethylene/α-olefin copolymer.

Of the ethylene polymer (B) of the present invention, MFR as measured in accordance with JIS K6922-1 at 190° C. under a load of 21.18 N is from 0.1 to 15 g/10 min, preferably from 0.5 to 10.0 g/10 min, more preferably from 1.0 to 5.0 g/10 min. If MFR is less than 0.1 g/min, the extrusion load at the time of forming tends to be heavy and in addition, surface roughening may occur at the time of forming. Further, if MFR is higher than 15 g/10 min, the melt tension tends to be small, and processing stability at the time of forming may decrease.

Of the ethylene polymer (B) of the present invention, the density as measured in accordance with JIS K6922-1 is within a range of from 930 to 960 kg/m$^3$, preferably from 935 to 955 kg/m$^3$, particularly preferably from 940 to 950 kg/m$^3$. If the density is less than 930 kg/m$^3$, heat resistance tends to be insufficient, and if its exceeds 960 kg/m$^3$, transparency may decrease.

The ethylene polymer (B) of the present invention has two peaks in molecular weight measurement by GPC. With respect to the peak top molecular weight (Mp), the molecular weight distribution curve obtained by GPC measurement is divided into two peaks by the after-described method, the top molecular weights of a peak on the high molecular weight side and a peak on the low molecular weight side are evaluated, and when the difference is at least 100,000, it is considered that there are two Mps. If the difference is less than 100,000, the top molecular weight of the molecular weight distribution curve measured is taken as one Mp.

The molecular weight distribution curve is divided as follows. Two logarithmic distribution curves are added, having a standard deviation of 0.30 and an optional average value (the molecular weight at the peak top position), to Log M in a molecular weight distribution curve having the weight ratio plotted relative to Log M which is the logarithm of the molecular weight, to prepare a synthetic curve. Further, the average and the ratio are obtained so that the sum of squared deviation of the weight ratio to the same molecular weight (M) of the measured molecular weight distribution curve and the synthetic curve becomes a minimum value. The minimum value of the sum of squared deviation is at most 0.5% to the sum of squared deviation in a case where all the ratios of the respective peaks are 0. When the average and the ratio which give the minimum value of the sum of squared deviation are obtained, the molecular weights at the peak tops in the logarithmic distribution curves obtained by the division into two logarithmic normal distribution curves are taken as Mp.

If an ethylene polymer having one peak in the molecular weight measurement by GPC is used as one component to obtain the polyethylene resin composition of the present invention, a film having high transparency cannot be obtained as in the case of using the ethylene polymer (B) having two peaks.

Of the ethylene polymer (B) of the present invention, the ratio (Mw/Mn) of the weight average molecular weight (Mw) to the number average molecular weight (Mn) is from 3.0 to 7.0, preferably from 3.0 to 6.5, more preferably from 3.0 to 6.0. If Mw/Mn is less than 3.0, not only the extrusion load at the time of forming is heavy, but also the outer appearance (surface skin) of the obtained film deteriorates.

If Mw/Mn is higher than 7.0, not only the strength of the container or member obtained decreases, but also when such a resin composition is used as a film, fine particles in a liquid contained in the film may increase.

Of the ethylene polymer (B) of the present invention, the number average molecular weight (Mn) as measured by GPC is preferably at least 15,000, more preferably from 15,000 to 100,000, particularly preferably from 15,000 to 50,000. When Mn is at least 15,000, the strength of the obtained film is high.

Of the ethylene polymer (B) of the present invention, a fraction having Mn of at least 100,000 obtained by molecular weight fractionation, has at least 0.15 long-chain branches having at least 6 carbon atoms per 1,000 carbon atoms of the main chain. If the number of the long-chain branches is less than 0.15, the melt tension may be small, and the forming stability may decrease, at the time of producing a film.

Further, of the ethylene polymer (B) of the present invention, the proportion of a fraction having Mn of at least 100,000 obtained by molecular weight fractionation is less than 40% of the entire ethylene polymer (B). When the proportion of a fraction having Mn of at least 100,000 obtained by molecular weight fractionation is less than 40% of the entire ethylene polymer (B), the extrusion load at the time of forming tends to be light, and the outer appearance (surface skin) of the obtained film tends to be favorable.

As described above, it was found that when the ethylene polymer (B) is blended within the above range in a film comprising the resin composition of the present invention, the forming stability at the time of producing the film improves and in addition, the obtained film is excellent in impact resistance and has high transparency maintained.

The ethylene polymer (B) of the present invention may be obtained, for example, by the method as described in JP-A-2012-126862, JP-A-2012-126863, JP-A-2012-158654, JP-A-2012-158656 or JP-A-2013-28703.

[III] High Density Polyethylene (C)

The high density polyethylene (C) used in the present invention may be an ethylene homopolymer or a copolymer of ethylene and an α-olefin.

The high density polyethylene (C) of the present invention has a melt mass flow rate (hereinafter referred to as MFR) as measured in accordance with JIS K6922-1 at 190° C. under a load of 21.18 N of from 0.1 to 15 g/10 min, preferably from 0.5 to 10.0 g/10 min, more preferably from 1.0 to 5.0 g/10 min. MFR is preferably from 0.1 to 15 g/10 min, in that the load on the extruder is light at the time of forming and in addition, forming stability will improve.

Of the high density polyethylene (C) of the present invention, the density in accordance with JIS K6922-1 is from 940 to 970 kg/m$^3$, preferably from 945 to 970 kg/m$^3$, more preferably from 950 to 965 kg/m$^3$. The density is preferably from 940 to 970 kg/m$^3$ in that the heat resistance is high so that the container will not deform by heat treatment and in addition, a decrease of the transparency will be small.

Of the high density polyethylene (C) of the present invention, a fraction having Mn of at least 100,000 obtained by molecular weight fractionation has at most 0.14 long-chain branches per 1,000 carbon atoms of the main chain.

When Mw/Mn of the high density polyethylene (B) of the present invention is within a range of from 2.0 to 3.5, forming property will be favorable without film drawbacks at the time of forming, and the transparency will improve.

Further, when Mn is at least 25,000, the transparency will improve.

The high density polyethylene (C) of the present invention may be a commercial product, and for example, Nipolon Hard 5700, 8500, 8022 (trade name) manufactured by TOSOH CORPORATION may be mentioned.

The high density polyethylene (C) of the present invention may be produced, for example, by slurry method, solution method or vapor-phase method. The high density polyethylene (C) may be produced, by using a Ziegler catalyst comprising an organic aluminum compound and a solid catalyst component containing magnesium and titanium, a metallocene catalyst comprising an organic transition metal compound containing a cyclopentadienyl derivative and a compound and/or an organic metal compound which reacts with it to form an ionic complex, or a vanadium catalyst, by homopolymerizing ethylene or copolymerizing ethylene and an α-olefin by the catalyst. The α-olefin may be one commonly called an α-olefin, and is preferably a $C_{3-12}$ α-olefin such as propylene, butene-1, hexene-1, octene-1 or 4-methyl-1-pentene. The copolymer of ethylene and an α-olefin may, for example, be an ethylene/hexene-1 copolymer, an ethylene/butene-1 copolymer or an ethylene/octene-1 copolymer.

[IV] Resin Composition

In the resin composition comprising the cyclic polyolefin (A) and the ethylene polymer (B) according to [1] of the present invention, as the blend ratio of the cyclic polyolefin (A) and the ethylene polymer (B), per 100 parts by weight of the total amount of (A) and (B), the amount of the cyclic polyolefin (A) is from 5 to 95 parts by weight, preferably from 10 to 90 parts by weight, more preferably from 20 to 80 parts by weight, and the amount of the ethylene polymer (B) is from 5 to 95 parts by weight, preferably from 10 to 90 parts by weight, more preferably from 20 to 80 parts by weight.

Further, per 100 parts by weight of the cyclic polyolefin (A) and the ethylene polymer (B), the high density polyethylene (C) is contained preferably in an amount of from 20 to 300 parts by weight, particularly preferably from 20 to 250 parts by weight.

If the amount of the ethylene polymer (B) is less than 5 parts by weight, the impact resistance will decrease, and if it exceeds 95 parts by weight, the heat resistance will be insufficient. The amount of the high density polyethylene (C) is preferably from 20 to 300 parts by weight in that the heat resistance is high so that the container will not deform by heat treatment and in addition, a decrease of the transparency will be small.

In the resin composition comprising the cyclic polyolefin (A) and the high density polyethylene (C) according to [8] of the present invention, as the blend ratio of the cyclic polyolefin (A) and the high density polyethylene (C), per 100 parts by weight of the total amount of (A) and (C), the amount of the cyclic polyolefin (A) is from 20 to 40 parts by weight, preferably from 20 to 35 parts by weight, more preferably from 20 to 30 parts by weight, and the amount of the high density polyethylene (C) is from 60 to 80 parts by weight, preferably from 65 to 80 parts by weight, more preferably from 70 to 80 parts by weight.

When the amount of the high density polyethylene (C) is at least 60 parts by weight, the sealing property will improve in order that peeling at a heat sealed portion on the periphery of the container does not occur, and when it is at most 80 parts by weight, the easily releasable sealing property will be achieved.

The resin composition of the present invention may be obtained by a method of mixing the cyclic polyolefin (A), the ethylene polymer (B) and the high density polyethylene (C) by a conventional method, for example, by a Henschel mixer, a V-blender, a ribbon blender or a tumbler blender, or by further melt-kneading a mixture obtained by such a method by e.g. a single screw extruder, a twin screw extruder, a kneader or a Banbury mixer, followed by granulation.

In the resin composition of the present invention, within a range not to remarkably impair the effects of the present invention, a commonly used known additive such as an antioxidant, a neutralizing agent, an antistatic agent, a lubricant, an anti-blocking agent, an anti-fogging agent, an organic or inorganic pigment, an ultraviolet absorber or a dispersing agent, may be blended as the case requires. The method of blending the above additive in the resin composition of the present invention is not particularly limited, and a method of directly adding the additive in a pellet granulation step after polymerization, or a method of preliminarily preparing a high concentration master batch, and dry-blending it at the time of forming, may be mentioned.

Further, in the resin composition of the present invention, within a range not to impair the effects of the present invention, other thermoplastic resin such as a high pressure low density polyethylene, an ethylene/propylene copolymer rubber or poly-1-butene may be blended.

[5] Film and Film Using the Film for Sealant Layer

The film of the present invention comprises the resin composition.

The thickness of the film of the present invention is not particularly limited and may be properly determined as the case requires, and is usually from 3 to 5,000 μm, preferably from 5 to 2,000 μm, and in a case where the film is used as a medical or food film, the thickness is usually from 10 to 500 μm, preferably from 20 to 300 μm.

The method for producing the film of the present invention is not particularly limited, and extrusion method, blow molding method, injection molding method, calendaring method, press forming method or blown-film extrusion method may, for example, be mentioned.

The film of the present invention can be used for the medical field in general, for example, as a film for infusion solutions or a film for blood. Further, the film formed from the resin composition of the present invention may be used also for the food field in general, for example, as a film for a retortable container or a shrink film.

The film of the present invention may be used for a sealant layer.

Advantageous Effects of Invention

The resin composition of the present invention has high impact strength and when formed into a film, the film is excellent in impact resistance and has high transparency maintained. Further, when the resin composition of the present invention is formed into a film, an easily releasable sealing property can be achieved even after sterilization.

REFERENCE SYMBOLS

Figure 1:
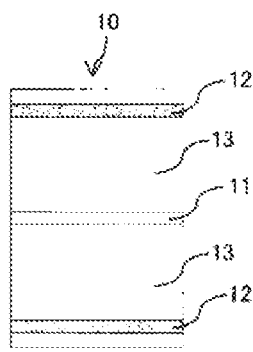
FIG. 1 is a plan view illustrating an example of a multi-chamber container of the present invention.

10: Multi-chamber container prepared from a cylindrical blown film
11: Easily releasable sealed portion
12: Periphery strongly sealed portion
13: Chamber partitioned by easily releasable sealed portion
EXAMPLES Now, the present invention will be described in further detail with reference to Examples. However, it should be understood that the present invention is by no means restricted to such specific Examples.

A: Resin

Various physical properties of the resin used in Examples and Comparative Examples were evaluated by the following method.

<Molecular Weight, Molecular Weight Distribution>

The weight average molecular weight (Mw), the number average molecular weight (Mn), the ratio (Mw/Mn) of the weight average molecular weight to the number average molecular weight and the peak top molecular weight (Mp) were measured by GPC, using a GPC apparatus (manufactured by TOSOH CORPORATION, HLC-8121GPC/HT (trade name)) and a column (manufactured by TOSOH CORPORATION, TSKgel GMHhr-H(20)HT (trade name)), at a column temperature set at 140° C., using 1,2,4-trichlorobenzene as an eluent. The measurement sample was prepared at a concentration of 1.0 mg/ml, and 0.3 ml of the measurement sample was injected for measurement. The analytical curve of the molecular weight was calibrated using a polystyrene sample having a known molecular weight. Mw and Mn were obtained as values as calculated as linear polyethylene.

<Molecular Weight Fractionation>

For molecular weight fractionation, using as a column a column (diameter 21 mm, length: 60 nm) packed with glass beads, at a column temperature set at 130° C., a solution of 1 g of a sample dissolved in 30 mL of xylene was injected. Then, using a mixture of xylene/2-ethoxyethanol in a proportion of 5:5 as a developing solvent, distillates were removed. Then, using xylene as a developing solvent, components remaining in the column were distilled off to obtain a polymer solution. The obtained polymer solution was mixed with methanol in an amount 5 times the polymer solution to precipitate polymer content, which was subjected to filtration and dried to obtain a component having Mn of at least 100,000.

<Long-Chain Branch>

To obtain the number of long-chain branches, the number of branches of a hexyl group and longer was measured by 13C-NMR using JNM-GSX400 nuclear magnetic resonance spectrometer manufactured by JEOL Ltd. The solvent was benzene-d6/orthodichlorobenzene (volume ratio: 30/70). The number per 1,000 carbon atoms (chemical shift: 30 ppm) of the main chain methylene carbon, was obtained from the average values of peaks of α-carbon (34.6 ppm) and β-carbon (27.3 ppm).

<Density>

The density was measured by density gradient tube method in accordance with JIS K6922-1.

<MFR>

MFR was measured in accordance with JIS K6922-1.

<Melt Tension>

As a sample for measuring the melt tension, a sample having a heat stabilizer (Irganox 1010™, 1,500 ppm, Irgafos 168™, 1,500 ppm, manufactured by Ciba Specialty Chemicals) added was kneaded by an internal mixer (manufactured by Toyo Seiki Seisaku-Sho, Ltd., trade name: LABO PLASTOMILL) in a stream of nitrogen at 190° C. at a number of revolutions of 30 rpm for 30 minutes.

To measure the melt tension, to a capillary viscometer (manufactured by Toyo Seiki Seisaku-Sho, Ltd., trade name: CAPILOGRAPH) having a barrel diameter of 9.55 mm, a die having a length of 8 mm and a diameter of 2.095 mm was set so that the entrance angle would be 90° for measurement. The temperature was set at 160° C., the piston descending speed was 10 mm/min, the draw ratio was set at 47, and the load (mN) required for drawing was taken as the melt tension. In a case where the maximum draw ratio was less than 47, the load (mN) required for drawing at the maximum draw ratio at which breaking did not occur was taken as the melt tension.

In Examples and Comparative Examples, resins prepared by the following methods and commercial products were used.

(1) Cyclic Polyolefin

The following commercial products were used.

(A)-1: Manufactured by Mitsui Chemicals, Inc., APEL APL6509T (trade name) ([MFR (ASTM D1238 (260° C., 21.18 N))]: 30 g/10 min)

(A)-2: Manufactured by Zeon Corporation, Zeonor 1020R (trade name) ([MFR (ISO 1133 (280° C., 21.1 N))]: 20 g/10 min)

(A)-3: Manufactured by TOPAS Advanced Polymers, TOPAS 9506F-04 (trade name) ([MVR (ISO 1133 (230° C., 21.18 N))]: 6 g/10 min)

(A)-4: Manufactured by TOPAS Advanced Polymers, TOPAS 8007F-04 (trade name) ([MVR (ISO 1133 (230° C., 21.18 N))]: 12 g/10 min)

(2) Ethylene Polymer

One obtained by any of the following production methods or a commercial product was used.

(B)-1: Obtained by the Following Production Method.

[Preparation of Modified Clay]

Into a 1 L flask, 300 mL of industrial alcohol (manufactured by Japan Alcohol Trading CO., LTD., EKINEN F-3 (trade name)) and 300 mL of distilled water were put, 18.8 g of concentrated hydrochloric acid and 49.1 g (120 mmol) of dimethylhexacosylamine ($Me_2N(C_{26}H_{53})$, prepared by conventional method) were added, followed by heating at 45° C., 100 g of synthetic Hectorite (manufactured by Rockwood Additives Ltd., LAPONITE RDS (trade name)) was dispersed, and the dispersion was heated to 60° C. and stirred for one hour while the temperature was maintained. The slurry was subjected to filtration, the residue was washed with 600 mL of water of 60° C. twice and dried in a dryer at 85° C. for 12 hours to obtain 140 g of organic modified clay. The organic modified clay was pulverized by a jet mill to a median diameter of 14 μm.

[Preparation of Polymer Catalyst]

A 300 mL flask equipped with a thermometer and a reflux condenser was replaced with nitrogen, and 25.0 g of the organic modified clay obtained in [Preparation of modified clay] and 108 mL of hexane were put, and then 0.4406 g of dimethylsilylene(cyclopentadienyl)(2,4,7-trimethyl-1-indenyl)zirconium dichloride and 142 mL of 20% triisobutylaluminum were added, followed by stirring at 60° C. for 3 hours. The mixture was cooled to 45° C., the supernatant was withdrawn, and the residue was washed with 200 mL of hexane five times and mixed with 200 ml of hexane to obtain a catalyst suspension (solid content by weight: 12.0 wt %).

[Production of (B)-1]

Into a 2 L autoclave, 1.2 L of hexane, 1.0 mL of 20% triisobutylaluminum and 75 mg (corresponding to solid content 9.0 mg) of the catalyst suspension obtained in [Preparation of polymerization catalyst] were added, followed by heating to 80° C., 8.3 g of 1-butene was added, and an ethylene/hydrogen mixed gas was continuously supplied (concentration of hydrogen in ethylene/hydrogen mixed gas: 850 ppm) so that the partial pressure would be 0.85 MPa. 90 minutes later, the pressure was lowered, and the slurry was subjected to filtration, and the residue was dried to obtain 58.5 g of polymer. Of the polymer, MFR was 4.0 g/10 min, and the density was 941 kg/m$^3$. Further, the number average molecular weight was 21,200, the weight average molecular weight was 74,000, and peaks were observed at positions of molecular weights of 41,500 and 217,100. Further, the number of long-chain branches contained in a fraction having Mn of at least 100,000 as obtained by molecular weight fractionation was 0.18 per 1,000 carbon atoms of the main chain. Further, the proportion of the fraction having Mn of at least 100,000 as obtained by molecular weight fractionation was 14.8 wt % of the entire polymer. Further, the melt tension was 49 mN. The evaluation results are shown in Table 1.

(B)-2: Obtained by the Following Production Method.
[Preparation of Modified Clay]

Into a 1 L flask, 300 mL of industrial alcohol (manufactured by Japan Alcohol Trading CO., LTD., EKINEN F-3 (trade name)) and 300 mL of distilled water were put, 17.5 g of concentrated hydrochloric acid and 49.4 g (140 mmol) of dimethylbehenylamine (manufactured by Lion Corporation, FARMIN DM22D (trade name)) were added, followed by heating to 45° C., 100 g of synthetic Hectorite (manufactured by Rockwood Additives Ltd., LAPONITE RDS (trade name)) was dispersed, and the dispersion was heated to 60° C. and stirred for one hour while the temperature was maintained. The slurry was subjected to filtration, the residue was washed with 600 mL of water of 60° C. twice and dried in a dryer at 85° C. for 12 hours to obtain 132 g of organic modified clay. The organic modified clay was pulverized by a jet mill to a median diameter of 15 μm.

[Preparation of Polymerization Catalyst]

A 300 mL flask equipped with a thermometer and a reflux condenser was replaced with nitrogen, 25.0 g of the organic modified clay obtained in [Preparation of modified clay] and 108 mL of hexane were put, and then 0.4406 g of dimethylsilylene(cyclopentadienyl)(2,4,7-trimethylindenyl)zirconium dichloride and 142 mL of 20% triisobutylaluminum were added, followed by stirring at 60° C. for 3 hours. The mixture was cooled to 45° C., the supernatant was withdrawn, and the residue was washed with 200 mL of hexane five times and mixed with 200 ml of hexane to obtain a catalyst suspension (solid content by weight: 12.4 wt %).

[Production of (B)-2]

Into a 2 L autoclave, 1.2 L of hexane, 1.0 mL of 20% triisobutylaluminum and 52 mg (corresponding to solid content 6.4 mg) of the catalyst suspension obtained in [Preparation of polymerization catalyst] were added, followed by heating to 70° C., 17.6 g of 1-butene was added, and an ethylene/hydrogen mixed gas was continuously supplied (concentration of hydrogen in ethylene/hydrogen mixed gas: 590 ppm) so that the partial pressure would be 0.80 MPa. 90 minutes later, the pressure was lowered, and the slurry was subjected to filtration, and the residue was dried to obtain 61.8 g of polymer. Of the polymer, MFR was 1.6 g/10 min, and the density was 930 kg/m$^3$. Further, the number average molecular weight was 17,600, the weight average molecular weight was 86,700, and peaks were observed at positions of molecular weights of 30,500 and 155,300. Further, the number of long-chain branches contained in a fraction having Mn of at least 100,000 as obtained by molecular weight fractionation was 0.27 per 1,000 carbon atoms of the main chain. Further, the proportion of the fraction having Mn of at least 100,000 as obtained by molecular weight fractionation was 20.1 wt % of the entire polymer. Further, the melt tension was 75 mN. The evaluation results are shown in Table 1.

(B)-3: Obtained by the Following Production Method.
[Preparation of Modified Clay]

Into a 1 L flask, 300 mL of industrial alcohol (manufactured by Japan Alcohol Trading Co., Ltd., EKINEN F-3 (trade name)) and 300 mL of distilled water were put, 15.0 g of concentrated hydrochloric acid and 42.4 g (120 mmol) of dimethylbehenylamine (manufactured by Lion Corporation, FARMIN DM22D (trade name)) were added, followed by heating to 45° C., 100 g of synthetic Hectorite (manufactured by Rockwood Additives Ltd., LAPONITE RDS (trade name)) was dispersed, and the dispersion was heated to 60° C. and stirred for one hour while the temperature was maintained. The slurry was subjected to filtration, the residue was washed with 600 mL of water of 60° C. twice and dried in a dryer at 85° C. for 12 hours to obtain 122 g of organic modified clay. The organic modified clay was pulverized by a jet mill to a median diameter of 15 μm.

[Preparation of Polymerization Catalyst]

A 300 mL flask equipped with a thermometer and a reflux condenser was replaced with nitrogen, 25.0 g of the organic modified clay obtained in [Preparation of modified clay] and 108 mL of hexane were put, and then 0.4406 g of dimethylsilylene(cyclopentadienyl)(2,4,7-trimethyl-1-indenyl)zirconium dichloride and 142 mL of 20% triisobutylaluminum were added, followed by stirring at 60° C. for 3 hours. The mixture was cooled to 45° C., the supernatant was withdrawn, and the residue was washed with 200 mL of hexane five times and mixed with 200 ml of hexane to obtain a catalyst suspension (solid content by weight: 11.5 wt %).

[Production of (B)-3]

Into a 2 L autoclave, 1.2 L of hexane, 1.0 mL of 20% triisobutylaluminum and 70 mg (corresponding to solid content 8.4 mg) of the catalyst suspension obtained in [Preparation of polymerization catalyst] were added, followed by heating to 80° C., 2.4 g of 1-butene was added, and an ethylene/hydrogen mixed gas was continuously supplied (concentration of hydrogen in ethylene/hydrogen mixed gas: 720 ppm) so that the partial pressure would be 0.90 MPa. 90 minutes later, the pressure was lowered, and the slurry was subjected to filtration, and the residue was dried to obtain 63.0 g of polymer. Of the polymer, MFR was 11.5 g/10 min, and the density was 954 kg/m$^3$. Further, the number average molecular weight was 16,200, the weight average molecular weight was 58,400, and peaks were observed at positions of molecular weights of 28,200 and 181,000. Further, the number of long-chain branches contained in a fraction having Mn of at least 100,000 as obtained by molecular weight fractionation was 0.16 per 1,000 carbon atoms of the main chain. Further, the proportion of the fraction having Mn of at least 100,000 as obtained by molecular weight fractionation was 6.8 wt % of the entire polymer. Further, the melt tension was 38 mN. The evaluation results are shown in Table 1.

(B)-4: Obtained by the Following Production Method.
[Preparation of Modified Clay]

Into a 1 L flask, 300 mL of industrial alcohol (manufactured by Japan Alcohol Trading Co., Ltd., EKINEN F-3 (trade name)) and 300 mL of distilled water were put, 20.0 g of concentrated hydrochloric acid and 56.5 g (160 mmol) of dimethylbehenylamine (manufactured by Lion Corporation, FARMIN DM22D (trade name)) were added, followed by heating to 45° C., 100 g of synthetic Hectorite (manufactured by Rockwood Additives Ltd., LAPONITE RDS (trade name)) was dispersed, and the dispersion was heated to 60° C. and stirred for one hour while the temperature was maintained. The slurry was subjected to filtration, the residue was washed with 600 mL of water of 60° C. twice and dried in a dryer at 85° C. for 12 hours to obtain 145 g of organic modified day. The organic modified clay was pulverized by a jet mill to a median diameter of 15 μm.

[Preparation of Polymerization Catalyst]

A 300 mL flask equipped with a thermometer and a reflux condenser was replaced with nitrogen, 25.0 g of the organic modified clay obtained in (1) and 108 mL of hexane were put, and then 0.4406 g of dimethylsilylene(cyclopentadienyl)(2,4,7-trimethyl-1-indenyl)zirconium dichloride and 142 mL of 20% triisobutylaluminum were added, followed by stirring at 60° C. for 3 hours. The mixture was cooled to 45° C., the supernatant was withdrawn, and the residue was washed with 200 mL of hexane five times and mixed with 200 ml of hexane to obtain a catalyst suspension (solid content by weight: 11.2 wt %).

[Production of (B)-4]

Into a 2 L autoclave, 1.2 L of hexane, 1.0 mL of 20% triisobutylaluminum and 74 mg (corresponding to solid content 8.3 mg) of the catalyst suspension obtained in [Preparation of polymerization catalyst] were added, followed by heating to 65° C., 17.5 g of 1-butene was added, and an ethylene/hydrogen mixed gas was continuously supplied (concentration of hydrogen in ethylene/hydrogen mixed gas: 570 ppm) so that the partial pressure would be 0.75 MPa. 90 minutes later, the pressure was lowered, and the slurry was subjected to filtration, and the residue was dried to obtain 51.5 g of polymer. Of the polymer, MFR was 0.8 g/10 min, and the density was 928 kg/m$^3$. Further, the number average molecular weight was 17,900, the weight average molecular weight was 99,300, and peaks were observed at positions of molecular weights of 28,100 and 229,100. Further, the number of long-chain branches contained in a fraction having Mn of at least 100,000 as obtained by molecular weight fractionation was 0.26 per 1,000 carbon atoms of the main chain. Further, the proportion of the fraction having Mn of at least 100,000 as obtained by molecular weight fractionation was 25.4 wt % of the entire polymer. Further, the melt tension was 90 mN. The evaluation results are shown in Table 1.

(B)-5: Obtained by the Following Production Method.

[Preparation of Modified Clay]

Into a 1 L flask, 300 mL of industrial alcohol (manufactured by Japan Alcohol Trading Co., Ltd., EKINEN F-3 (trade name)) and 300 mL of distilled water were put, 15.0 g of concentrated hydrochloric acid and 42.4 g (120 mmol) of dimethylbehenylamine (manufactured by Lion Corporation, FARMIN DM22D (trade name)) were added, followed by heating to 45° C., 100 g of synthetic Hectorite (manufactured by Rockwood Additives Ltd., LAPONITE RDS (trade name)) was dispersed, and the dispersion was heated to 60° C. and stirred for one hour while the temperature was maintained. The slurry was subjected to filtration, the residue was washed with 600 mL of water of 60° C. twice and dried in a dryer at 85° C. for 12 hours to obtain 122 g of organic modified clay. The organic modified clay was pulverized by a jet mill to a median diameter of 15 μm.

[Preparation of Polymerization Catalyst]

A 300 mL flask equipped with a thermometer and a reflux condenser was replaced with nitrogen, 25.0 g of the organic modified clay obtained in [Preparation of modified clay] and 108 mL of hexane were put, and then 0.4406 g of dimethylsilylene(cyclopentadienyl)(2,4,7-trimethyl-1-indenyl)zirconium dichloride and 142 mL of 20% triisobutylaluminum were added, followed by stirring at 60° C. for 3 hours. The mixture was cooled to 45° C., the supernatant was withdrawn, and the residue was washed with 200 mL of hexane five times and mixed with 200 ml of hexane to obtain a catalyst suspension (solid content by weight: 11.5 wt %).

[Production of (B)-5]

Into a 2 L autoclave, 1.2 L of hexane, 1.0 mL of 20% triisobutylaluminum and 90 mg (corresponding to solid content 10.4 mg) of the catalyst suspension obtained in [Preparation of polymerization catalyst] were added, followed by heating to 65° C., 17.5 g of 1-butene was added, and an ethylene/hydrogen mixed gas was continuously supplied (concentration of hydrogen in ethylene/hydrogen mixed gas: 550 ppm) so that the partial pressure would be 0.75 MPa. 90 minutes later, the pressure was lowered, and the slurry was subjected to filtration, and the residue was dried to obtain 61.4 g of polymer. Of the polymer, MFR was 0.08 g/10 min, and the density was 926 kg/m$^3$. Further, the number average molecular weight was 21,900, the weight average molecular weight was 127,000, and peaks were observed at positions of molecular weights of 31,300 and 247,800. Further, the number of long-chain branches contained in a fraction having Mn of at least 100,000 as obtained by molecular weight fractionation was 0.32 per 1,000 carbon atoms of the main chain. Further, the proportion of the fraction having Mn of at least 100,000 as obtained by molecular weight fractionation was 36.9 wt % of the entire polymer. Further, the melt tension was 140 mN. The evaluation results are shown in Table 1.

(B)-6: Obtained by the Following Production Method.

[Preparation of Modified Clay]

Into a 1 L flask, 300 mL of industrial alcohol (manufactured by Japan Alcohol Trading Co., Ltd., EKINEN F-3 (trade name)) and 300 mL of distilled water were put, 15.0 g of concentrated hydrochloric acid and 42.4 g (120 mmol) of dimethylbehenylamine (manufactured by Lion Corporation, FARMIN DM22D (trade name)) were added, followed by heating to 45° C., 100 g of synthetic Hectorite (manufactured by Rockwood Additives Ltd., LAPONITE RDS (trade name)) was dispersed, and the dispersion was heated to 60° C. and stirred for one hour while the temperature was maintained. The slurry was subjected to filtration, and the residue was washed with 600 mL of water of 60° C. twice and dried in a dryer at 85° C. for 12 hours to obtain 122 g of organic modified clay. The organic modified clay was pulverized by a jet mill to a median diameter of 15 μm.

[Preparation of Polymerization Catalyst]

A 300 mL flask equipped with a thermometer and a reflux condenser was replaced with nitrogen, 25.0 g of the organic modified clay obtained in [Preparation of modified clay] was suspended in 165 mL of hexane, 0.3485 g of dimethylsilanediylbis(cyclopentadienyl)zirconium dichloride and 85 mL of a hexane solution (1.18 M) of triethylaluminum were added, followed by stirring at 60° C. for 3 hours. The mixture was left at rest and cooled to room temperature, the supernatant was withdrawn, and the residue was washed with 200 mL of a hexane solution of 1% triisobutylaluminum twice. The supernatant after washing was withdrawn, and the residue was mixed with a hexane solution of 5% triisobutylaluminum to the entire amount of 250 mL. Further, a solution prepared by adding 5 ml of a hexane solution (0.71 M) of 20% triisobutylaluminum to a suspension of 0.1165 g of diphenylmethylene(1-cyclopentadienyl)(2,7-di-tert-butyl-9-fluorenyl)zirconium dichloride in 10 mL of hexane, was added, followed by stirring at room temperature for 6 hours. The mixture was left at rest, the supernatant was removed, and the residue was washed with 200 mL of hexane twice, and mixed with 200 mL of hexane to obtain a catalyst suspension (solid content by weight: 12.0 wt %).

[Production of (B)-6]

Into a 2 L autoclave, 1.2 L of hexane, 1.0 mL of 20% triisobutylaluminum and 125 mg (corresponding to solid content 15.0 mg) of the catalyst suspension obtained in [Preparation of polymerization catalyst] were added, followed by heating to 85° C., 2.4 g of 1-butene was added, and ethylene was continuously supplied so that the partial pressure would be 0.90 MPa. 90 minutes later, the pressure was lowered, and the slurry was subjected to filtration, and the residue was dried to obtain 45.0 g of polymer. Of the polymer, MFR was 4.4 g/10 min, and the density was 951 kg/m³. Further, the number average molecular weight was 9,100, the weight average molecular weight was 77,100, and peaks were observed at positions of molecular weights of 10,400 and 168,400. Further, the number of long-chain branches contained in a fraction having Mn of at least 100,000 as obtained by molecular weight fractionation was 0.24 per 1,000 carbon atoms of the main chain. Further, the proportion of the fraction having Mn of at least 100,000 as obtained by molecular weight fractionation was 15.7 wt % of the entire polymer. Further, the melt tension was 210 mN. The evaluation results are shown in Table 1.

(S)-1: The Following Commercial Product was Used.

Manufactured by TOSOH CORPORATION, PETROTHENE 219 (trade name) (MFR: 3.0 g/10 min, density: 934 kg/m³) The results of evaluation of basic properties of (S)-1 are shown in Table 1.

% solution of triisobutylaluminum was added, and the mixture was diluted again with hexane to adjust the entire amount to be 4.5 L to prepare a polymerization catalyst.

[Production of (C)-1]

Into a polymerization vessel having an internal capacity of 300 L, hexane at 135 kg/hour, ethylene at 20.0 kg/hour, butene-1 at 0.3 kg/hour, hydrogen at 5 NL/hour and the polymerization catalyst obtained in [Preparation of polymerization catalyst] were continuously supplied. Further, triisobutylaluminum as a promoter was continuously supplied so that its concentration in the liquid would be 0.93 mmol/kg hexane. The polymerization temperature was controlled to be 85° C. The obtained high density polyethylene ((C)-1) had MFR of 1.0 g/10 min and a density of 952 kg/m³. The results of evaluation of basic properties of (C)-1 are shown in Table 2.

(C)-2: Obtained by the Following Production Method.

TABLE 1

| Ethylene polymer | Unit | (B)-1 | (B)-2 | (B)-3 | (B)-4 | (B)-5 | (B)-6 | (S)-1 |
|---|---|---|---|---|---|---|---|---|
| MFR | g/10 min | 4.0 | 1.6 | 11.5 | 0.8 | 0.08 | 4.4 | 3.0 |
| Density | kg/m³ | 941 | 930 | 954 | 928 | 926 | 951 | 934 |
| Mn | — | 21,200 | 17,600 | 16,200 | 17,900 | 21,900 | 9,100 | 18,300 |
| Mw | — | 74,000 | 86,700 | 58,400 | 99,300 | 127,000 | 77,100 | 66,600 |
| Mw/Mn | — | 3.5 | 4.9 | 3.6 | 5.6 | 5.8 | 8.5 | 3.6 |
| Molecular weight peak | — | 41,500 217,100 | 30,500 155,300 | 28,200 181,000 | 28,100 229,100 | 31,300 247,800 | 10,400 168,400 | 39,800 — |
| Number of long-chain branches in component having Mn of at least 100,000 | Number/1,000 carbon atoms | 0.18 | 0.27 | 0.16 | 0.26 | 0.32 | 0.24 | 5.30 |
| Proportion of component having Mn of at least 100,000 | wt % | 14.8 | 20.1 | 6.8 | 25.4 | 36.9 | 15.7 | 17.8 |
| MS | mN | 49 | 75 | 38 | 90 | 140 | 210 | 90 |

(3) High Density Polyethylene

Ones obtained by the following production methods or a commercial product was used.

(C)-1: Obtained by the Following Production Method.

[Preparation of Modified Clay]

Into a mixed solvent of 4.8 L of deionized water and 3.2 L of ethanol, 354 g of dimethylbehenylamine (($C_{22}H_{45}$)($CH_3$)$_2$N) and 83.3 mL of 37% hydrochloric acid were added to prepare a dimethylbehenylamine hydrochloride solution. To the solution, 1,000 g of synthetic Hectorite was added, followed by stirring overnight, the obtained reaction liquid was subjected to filtration, and the solid content was sufficiently washed with water. The solid content was dried to obtain 1,180 g of organic modified clay. The liquid content measured by an infrared moisture meter was 0.8%. Then, the organic modified clay was pulverized to have an average particle size of 6.0 μm.

[Preparation of Polymerization Catalyst]

In a 5 L flask, 450 g of the organic modified clay obtained in [Preparation of modified clay] and 1.4 kg of hexane were added, and 1.78 kg (1.8 mol) of a hexane 20 wt % solution of triisobutylaluminum and 7.32 g (18 mmol) of bis(n-butylcyclopentadienyl)zirconium dichloride were added, followed by stirring for one hour with heating to 60° C. The reaction solution was cooled to 45° C., and left at rest for 2 hours, and the supernatant was removed by gradient method. Then, 1.78 kg (0.09 mol) of a hexane 1 wt % solution of triisobutylaluminum was added, followed by reaction at 45° C. for 30 minutes. The reaction solution was left at rest at 45° C. for 2 hours, and the supernatant was removed by gradient method, and 0.45 kg (0.45 mol) of a hexane 20 wt

[Preparation of Modified Clay]

Modified clay was prepared in the same manner as of (C)-1.

[Preparation of Polymerization Catalyst]

A polymerization catalyst was prepared in the same manner as of (C)-1.

[Production of (C)-2]

Into a polymerization vessel having an internal capacity of 300 L, hexane at 135 kg/hour, ethylene at 20.0 kg/hour, butene-1 at 0.4 kg/hour, hydrogen at 8 NL/hour and the polymerization catalyst obtained in [Preparation of polymerization catalyst] were continuously supplied. Further, triisobutylaluminum as a promoter was continuously supplied so that its concentration in the liquid would be 0.93 mmol/kg hexane. The polymerization temperature was controlled to be 85° C. The obtained high density polyethylene ((C)-2) had MFR of 3.0 g/10 min and a density of 945 kg/m³. The results of evaluation of basic properties of (C)-2 are shown in Table 2.

(P)-1: The following commercial product was used. The results of evaluation of basic properties of (P)-1 are shown in Table 2.

Manufactured by TOSOH CORPORATION, Nipolon Hard 5700 (trade name) (MFR: 1.0 g/10 min, density: 954 kg/m³)

TABLE 2

| High density polyethylene | Unit | (C)-2 | (C)-1 | (P)-1 |
|---|---|---|---|---|
| MFR | g/10 min | 3.0 | 1.0 | 1.0 |
| Density | kg/m³ | 945 | 952 | 954 |

TABLE 2-continued

| High density polyethylene | Unit | (C)-2 | (C)-1 | (P)-1 |
|---|---|---|---|---|
| Mn | — | 32,000 | 42,000 | 22,000 |
| Mw | — | 83,000 | 109,000 | 118,000 |
| Mw/Mn | — | 2.6 | 2.6 | 5.4 |
| Number of long-chain branches in component having Mn of at least 100,000 | Number/1,000 carbon atoms | At most 0.09 | At most 0.09 | At most 0.09 |

(4) Linear Low Density Polyethylene

The following commercial product was used.

(Q)-1: Manufactured by TOSOH CORPORATION, Nipolon-Z HF213K (trade name) (MFR: 2.0 g/10 min, density: 905 kg/m$^3$)

(5) Polypropylene

The following commercial product was used.

(R)-1: Manufactured by Japan Polypropylene Corporation NOVATEC (registered trademark) PP FW4B (trade name) (MFR: 6.5 g/10 min (230° C.), density: 900 kg/m$^3$)

Examples 1 to 12 and Comparative Examples 1 to 13

A film was produced by the following method using the resin composition as identified in Table 3 or 4, and evaluated.

<Production of Film>

Pellets of the resin composition were heat-compressed by a compression molding machine AWFA. 50 (manufactured by Sinto Metal Industries, Ltd.) at a heating temperature of 200° C. under a heating pressure of 10 kgf/cm$^2$ for a heating time of 10 minutes and solidified at a cooling temperature of 30° C. under a cooling pressure of 10 kgf/cm$^2$ for a cooling time of 4 minutes to produce a 200 μm film for evaluation.

<Evaluation of Film>

Various properties of the films in Examples 1 to 12 and Comparative Examples 1 to 13 were evaluated by the following methods. The results are shown in Tables 5, 6, 7 and 8.

<Transparency>

A test specimen of 10 mm×50 mm was cut out from the above film, and the light transmittance at a wavelength of 450 nm was measured in pure water using an ultraviolet/visible spectrophotometer (manufactured by JASCO Corporation, model V-530). A sample having a light transmittance of at least 45% was evaluated as having high transparency.

<Low-Temperature Impact Strength>

The impact strength was measured in accordance with JIS K7160 method B at a temperature of at most −20° C. A sample having an impact strength of at least 30 kJ/m$^2$ was evaluated as having high impact resistance.

TABLE 3

| | | X-1 | X-2 | X-3 | X-4 | X-5 | X-6 | X-7 | X-8 | X-9 | X-10 | X-11 | X-12 |
|---|---|---|---|---|---|---|---|---|---|---|---|---|---|
| Cyclic polyolefin (A) | Resin No. | (A)-1 | (A)-1 | (A)-1 | (A)-1 | (A)-1 | (A)-1 | (A)-1 | (A)-2 | (A)-3 | (A)-4 | (A)-1 | (A)-1 |
| Ethylene polymer (B) | Resin No. | (B)-1 | (B)-1 | (B)-1 | (B)-1 | (B)-1 | (B)-1 | (B)-1 | (B)-1 | (B)-1 | (B)-1 | (B)-2 | (B)-3 |
| | Density | 941 | 941 | 941 | 941 | 941 | 941 | 941 | 941 | 941 | 941 | 930 | 954 |
| | MFR | 4.0 | 4.0 | 4.0 | 4.0 | 4.0 | 4.0 | 4.0 | 4.0 | 4.0 | 4.0 | 1.6 | 11.5 |
| High density polyethylene (C) | Resin No. | — | — | — | (C)-1 | (C)-1 | (C)-1 | (C)-1 | — | — | — | — | — |
| | Density | — | — | — | 952 | 952 | 952 | 952 | — | — | — | — | — |
| | MFR | — | — | — | 1.0 | 1.0 | 1.0 | 1.0 | — | — | — | — | — |
| Composition (A)/(B) | Parts by weight | 75/25 | 50/50 | 25/75 | 93/7 | 80/20 | 57/43 | 17/83 | 50/50 | 50/50 | 50/50 | 50/50 | 50/50 |
| Amount of (C) | Parts by weight | 0 | 0 | 0 | 23 | 60 | 127 | 250 | 0 | 0 | 0 | 0 | 0 |

TABLE 4

| | | Y-1 | Y-2 | Y-3 | Y-4 | Y-5 | Y-6 | Y-7 | Y-8 | Y-9 | Y-10 | Y-11 | Y-12 | Y-13 |
|---|---|---|---|---|---|---|---|---|---|---|---|---|---|---|
| Cyclic polyolefin (A) | Resin No. | (A)-1 | (A)-2 | (A)-3 | (A)-4 | (A)-1 | (A)-1 | (A)-1 | (A)-1 | (A)-1 | (A)-1 | (A)-1 | (A)-1 | (A)-1 |
| Ethylene polymer (B) | Resin No. | — | — | — | — | — | — | — | — | — | (B)-4 | (B)-5 | (B)-6 | (S)-1 |
| | Density | — | — | — | — | — | — | — | — | — | 928 | 926 | 951 | 934 |
| | MFR | — | — | — | — | — | — | — | — | — | 0.08 | 0.1 | 4.4 | 3.0 |
| High density polyethylene (C) | Resin No. | — | — | — | — | (C)-2 | (C)-2 | — | — | — | — | — | — | — |
| | Density | — | — | — | — | 945 | 945 | — | — | — | — | — | — | — |
| | MFR | — | — | — | — | 3.0 | 3.0 | — | — | — | — | — | — | — |
| Linear low density polyethylene (Q) | Resin No. | — | — | — | — | — | — | (Q)-1 | (Q)-1 | (Q)-1 | — | — | — | — |
| | Density | — | — | — | — | — | — | 905 | 905 | 905 | — | — | — | — |
| | MFR | — | — | — | — | — | — | 2.0 | 2.0 | 2.0 | — | — | — | — |
| Composition (A)/(B) | Parts by weight | 100/0 | 100/0 | 100/0 | 100/0 | 100/0 | 100/0 | 100/0 | 100/0 | 100/0 | 50/50 | 50/50 | 50/50 | 50/50 |
| Amount of (C) | Parts by weight | 0 | 0 | 0 | 0 | 100 | 300 | 0 | 0 | 0 | 0 | 0 | 0 | 0 |
| Amount of (Q) | Parts by weight | 0 | 0 | 0 | 0 | 0 | 0 | 33 | 100 | 300 | 0 | 0 | 0 | 0 |

TABLE 5

| | Unit | Example 1 | Example 2 | Example 3 | Example 4 | Example 5 | Example 6 |
|---|---|---|---|---|---|---|---|
| Resin composition | — | X-1 | X-2 | X-3 | X-4 | X-5 | X-6 |
| Low-temperature impact strength | kJ/m$^2$ | 31 | 61 | 95 | 58 | 134 | 187 |
| Light transmittance | % | 69 | 64 | 46 | 70 | 57 | 49 |

TABLE 6

| | Unit | Example 7 | Example 8 | Example 9 | Example 10 | Example 11 | Example 12 |
|---|---|---|---|---|---|---|---|
| Resin composition | — | X-7 | X-8 | X-9 | X-10 | X-11 | X-12 |
| Low-temperature impact strength | kJ/m$^2$ | 214 | 58 | 63 | 59 | 131 | 51 |
| Light transmittance | % | 45 | 70 | 68 | 69 | 63 | 68 |

TABLE 7

| | Unit | Comp. Example 1 | Comp. Example 2 | Comp. Example 3 | Comp. Example 4 | Comp. Example 5 | Comp. Example 6 |
|---|---|---|---|---|---|---|---|
| Resin composition | — | Y-1 | Y-2 | Y-3 | Y-4 | Y-5 | Y-6 |
| Low-temperature impact strength | kJ/m$^2$ | 3 | 1 | 4 | 2 | 109 | 170 |
| Light transmittance | % | 97 | 96 | 95 | 95 | 44 | 30 |

TABLE 8

| | Unit | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|
| Resin composition | — | Y-7 | Y-8 | Y-9 | Y-10 | Y-11 | Y-12 | Y-13 |
| Low-temperature impact strength | kJ/m$^2$ | 66 | 289 | 721 | 130 | 142 | 48 | 85 |
| Light transmittance | % | 9 | 6 | 8 | 44 | 39 | 43 | 22 |

Examples 13 to 22 and Comparative Examples 14 to 20

Using the resin composition as identified in Table 9 or 10, a film and a container were produced and evaluated by the following method. The results are shown in Tables 11 and 12.

<Preparation of Film and Container>

Using a water cooling three-layer co-extrusion blown film making machine (manufactured by Placo Co., Ltd.), a three-layer film having a film width of 135 mm and a film thickness of 250 μm was produced at an outer layer and intermediate layer cylinder temperature of 180° C., at an inner layer cylinder temperature of 230° C., at a water bath temperature of 15° C., at a drawing rate of 4 m/min. The thicknesses of the respective layers were such that outer layer/intermediate layer/inner layer. 20 μm/210 μm/20 μm. The resin composition of the present invention was used for the inner layer, a linear low density polyethylene Nipolon-P FY12 (trade name) (MFR: 1.5 g/10 min, density: 916 kg/m$^3$)

manufactured by TOSOH CORPORATION was used for the intermediate layer, and a high density polyethylene Nipolon-P FY13 (trade name) (MFR: 1.1 g/10 min, density: 950 kg/m$^3$) manufactured by TOSOH CORPORATION was used for the outer layer. Then, a sample having a length of 200 mm was cut out from the three-layer film, one edge was heat-sealed to form a bag, which was filled with 300 ml of ultrapure water, and the opening was heat-sealed with 50 ml of a head space to prepare a container for sterilization.

<Sterilization>

The container was subjected to sterilization using a high temperature high pressure retort sterilizer (manufactured by HISAKA WORKS, LTD.) at a temperature of 121° C. for 20 minutes.

<Evaluation of Film Properties>

The film properties were evaluated by the following method.

<Transparency>

A test specimen of 10 mm×50 mm was cut out from each of the three-layer film and the container after sterilization, and the light transmittance at a wavelength of 450 nm was measured in pure water using an ultraviolet/visible spectrophotometer (manufactured by JASCO Corporation, model V-530). A container having a light transmittance of at least 70% maintained after sterilization was evaluated as having favorable transparency.

<Outer Appearance>

Wrinkles on the film surface, deformation, fusion between inner layers, etc. after sterilization were visually evaluated, and a film with no wrinkle nor deformation observed counts 4 point, a film with slight wrinkle or deformation observed counts 3 points, a film with remarkable wrinkle or deformation observed counts 2 points, and a film with fusion of the inner layers observed counts 1 point.

<Sealing Stability after Sterilization>

The shape of the easily releasable sealed part after sterilization was visually evaluated.

◯: No change in the sealed layer shape
Δ: Sealed layer partly peeled (such as a decrease of sealing width)
x: Sealed layer peeled, and chambers connected <Sealing Strength after Sterilization>

The heat-sealed portion was cut into a strip having a width of 15 mm vertical to the sealing direction, 180° peeling was conducted at a rate of 200 mm/min, and the maximum value obtained at the time of peeling was taken as the peel strength (test was conducted with n=5, and the average was calculated). A case where the sealing strength after sterilization was at least 35 N/15 mm is evaluated as having strong sealing property so that peeling or the like at the heat sealed portion at the periphery of the container would not occur.

<Sealing Temperature Width after Sterilization>

Figure 2:
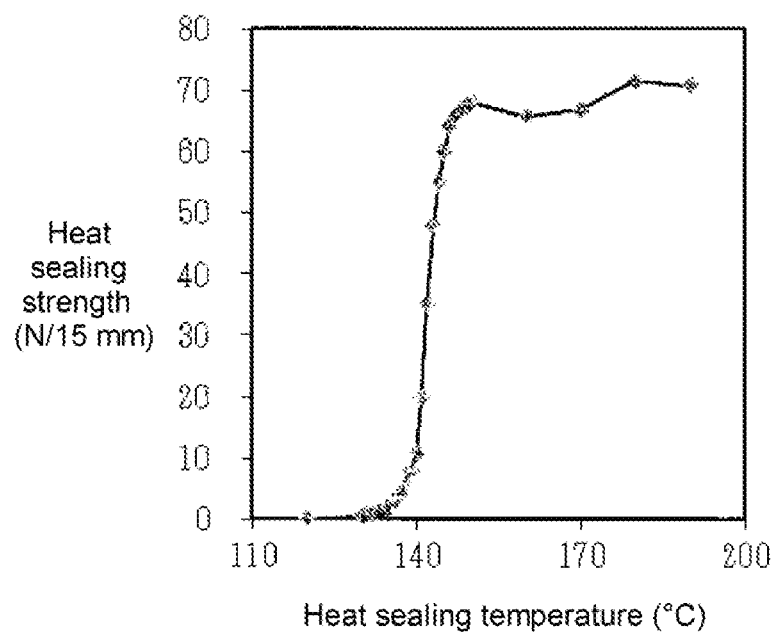
FIG. 2 is a graph illustrating the results in Comparative Example 21 as an example of the relation between the heat sealing temperature and the sealing strength.

The blown film (cylindrical) having the inner layers, that is, the sealant layers faced each other, was heat-sealed under a sealing pressure of 2 kg/cm$^2$ for a sealing time of 2 seconds at a sealing temperature changed at 1 to 2° C. intervals, to prepare samples. Then, each sample was subjected to sterilization at 121° C. for 20 minutes, and the sealing strength was measured by the method disclosed in the above <Sealing strength> to prepare a graph (heat sealing curve) as shown in FIG. 2 illustrating the relation between the sealing strength and the sealing temperature. Using the graph, a sealing temperature width at which the sealing strength would be from 5 to 20 N/15 mm was calculated. A case where the sealing temperature width was at least 6° C. was evaluated to be such that the variation of the sealing strength at the easily releasable sealed portion was small, and stable easily releasable property was obtained.

Comparative Example 21

A film was prepared in the same manner as in Example 13 except that the inner layer resin composition was changed to (C)-3, and various properties of the film and the container were evaluated. The results are shown in Table 12.

TABLE 9

|  |  | X-13 | X-14 | X-15 | X-16 | X-17 | X-18 | X-19 | X-20 | X-21 | X-22 |
|---|---|---|---|---|---|---|---|---|---|---|---|
| Cyclic polyolefin (A) | Resin No. | (A)-1 | (A)-1 | (A)-2 | (A)-3 | (A)-4 | (A)-1 | (A)-1 | (A)-1 | (A)-1 | (A)-1 |
| Ethylene polymer (B) | Resin No. | (B)-1 | (B)-1 | (B)-1 | (B)-1 | (B)-1 | (B)-2 | (B)-3 | (B)-1 | (B)-1 | (B)-1 |
|  | Density | 941 | 941 | 941 | 941 | 941 | 930 | 954 | 941 | 941 | 941 |
|  | MFR | 4.0 | 4.0 | 4.0 | 4.0 | 4.0 | 1.6 | 11.5 | 4.0 | 4.0 | 4.0 |
| High density polyethylene (C) | Resin No. | — | — | — | — | — | — | — | (C)-1 | (C)-1 | (C)-1 |
|  | Density | — | — | — | — | — | — | — | 952 | 952 | 952 |
|  | MFR | — | — | — | — | — | — | — | 1.0 | 1.0 | 1.0 |
| Composition (A)/(B) | Parts by weight | 30/70 | 20/80 | 20/80 | 40/60 | 30/70 | 40/60 | 20/80 | 73/28 | 65/35 | 50/50 |
| Amount of (C) | Parts by weight | 0 | 0 | 0 | 0 | 0 | 0 | 0 | 82 | 115 | 150 |

TABLE 10

|  |  | Y-14 | Y-15 | Y-16 | Y-17 | Y-18 | Y-19 | Y-20 |
|---|---|---|---|---|---|---|---|---|
| Cyclic polyolefin (A) | Resin No. | (A)-1 | (A)-1 | (A)-1 | (A)-1 | — | (A)-1 | (A)-1 |
| Ethylene polymer (B) | Resin No. | (B)-1 | — | — | — | — | (B)-1 | (B)-1 |
|  | Density | 941 | — | — | — | — | 941 | 941 |
|  | MFR | 4.0 | — | — | — | — | 4.0 | 4.0 |
| High density polyethylene (C) | Resin No. | — | — | — | — | (C)-2 | (C)-1 | (0-1 |
|  | Density | — | — | — | — | 945 | 952 | 952 |
|  | MFR | — | — | — | — | 3.0 | 1.0 | 1.0 |
| Linear | Resin No. | — | (Q)-1 | (Q)-1 | (Q)-1 | — | — | — |

TABLE 10-continued

|  |  | Y-14 | Y-15 | Y-16 | Y-17 | Y-18 | Y-19 | Y-20 |
|---|---|---|---|---|---|---|---|---|
| low density polyethylene (Q) | Density | — | 905 | 905 | 905 | — | — | — |
|  | MFR | — | 2.0 | 2.0 | 2.0 | — | — | — |
| Polypropylene (R) | Resin No. | — | — | — | — | (R)-1 | — | — |
|  | Density | — | — | — | — | 900 | — | — |
|  | MFR | — | — | — | — | 6.5 | — | — |
| Composition (A)/(B) | Parts by weight | 55/45 | 100/0 | 100/0 | 100/0 | 0/0 | 76/24 | 70/30 |
| Amount of (C) | Parts by weight | 0 | 0 | 0 | 0 | 80 | 70 | 200 |
| Amount of (Q) | Parts by weight | 0 | 43 | 67 | 100 | 0 | 0 | 0 |
| Amount of (R) | Parts by weight | 0 | 0 | 0 | 0 | 20 | 0 | 0 |

TABLE 11

|  |  |  | Unit | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|---|
|  | Inner layer resin composition |  | — | X-13 | X-14 | X-15 | X-16 | X-17 | X-18 | X-19 | X-20 | X-21 | X-22 |
| Film physical properties | Light transmittance | Before sterilization | % | 84 | 86 | 87 | 85 | 83 | 84 | 83 | 81 | 85 | 84 |
|  |  | After sterilization | % | 77 | 77 | 78 | 76 | 75 | 75 | 74 | 70 | 76 | 76 |
|  | Outer appearance after sterilization |  | — | 4 | 4 | 4 | 4 | 4 | 4 | 4 | 4 | 4 | 4 |
|  | Sealing stability after sterilization |  | — | ◯ | ◯ | ◯ | ◯ | ◯ | ◯ | ◯ | ◯ | ◯ | ◯ |
|  | Sealing strength after sterilization |  | N/15 mm | 42 | 54 | 54 | 35 | 40 | 38 | 55 | 39 | 54 | 56 |
|  | Sealing temperature width after sterilization |  | °C. | 30 | 7 | 6 | 12 | 25 | 15 | 10 | 40 | 10 | 7 |

TABLE 12

|  |  |  | Unit | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 |
|---|---|---|---|---|---|---|---|---|---|---|---|
|  | Inner layer resin composition |  | — | Y-14 | Y-15 | Y-16 | Y-17 | Y-18 | Y-19 | Y-20 | (C)-3 |
| Film physical properties | Transparency | Before sterilization | % | 81 | 78 | 74 | 76 | 80 | 82 | 86 | 84 |
|  |  | After sterilization | % | 70 | 65 | 61 | 56 | 68 | 71 | 75 | 75 |
|  | Outer appearance after sterilization |  | — | 4 | 1 | 1 | 1 | 4 | 4 | 4 | 4 |
|  | Sealing stability after sterilization |  | — | ◯ | —[2] | —[2] | —[2] | ◯ | Δ | ◯ | ◯ |
|  | Sealing strength after sterilization |  | N/15 mm | 7 | 40 | 51 | 50 | 58 | 20 | 61 | 65 |
|  | Sealing temperature width after sterilization |  | °C. | >50 [1] | —[3] | —[3] | —[3] | 10.0 | >50 [1] | 5 | 5 |

[1] In the measured heat sealing temperature region, the heat sealing strength did not reach 20 N/15 mm.

[2] The sealed peripheries fused by sterilization, and the sealing stability could not be evaluated.

[3] The sealed portions fused by sterilization and the heat sealing strength increased and as a result, a sample showing a strength of from 5 to 20 N/15 mm could not be obtained.

Examples 23 to 28 and Comparative Examples 22 to 24

Using the resin compositions as identified in Tables 13 and 14, a film was produced in the same manner as in Example 1 and evaluated. The results are shown in Tables 15 and 16.

TABLE 13

|  |  | X-23 | X-24 | X-25 | X-26 | X-27 | X-28 |
|---|---|---|---|---|---|---|---|
| Cyclic polyolefin (A) | Resin No. | (A)-2 | (A)-3 | (A)-4 | (A)-1 | (A)-2 | (A)-4 |
| High density polyethylene (C) | Resin No. | (C)-2 | (C)-2 | (C)-2 | (C)-1 | (C)-2 | (C)-2 |
|  | Density | 945 | 945 | 945 | 952 | 945 | 945 |
|  | MFR | 3.0 | 3.0 | 3.0 | 1.0 | 3.0 | 3.0 |
| Composition (A)/(C) | Parts by weight | 40/60 | 30/70 | 20/80 | 30/70 | 30/70 | 30/70 |

TABLE 14

|  |  | Y-21 | Y-22 | Y-23 |
|---|---|---|---|---|
| Cyclic polyolefin (A) | Resin No. | (A)-1 | (A)-1 | (A)-1 |
| High density polyethylene (C) | Resin No. | (C)-2 | (P)-1 | — |
|  | Density | 945 | 954 | — |
|  | MFR | 3.0 | 1.0 | — |
| Linear low density polyethylene (Q) | Resin No. | — | — | (Q)-1 |
|  | Density | — | — | 905 |
|  | MFR | — | — | 2.0 |
| Composition (A)/(C)/(Q) | Parts by weight | 10/90/0 | 75/25/0 | 75/0/25 |

TABLE 15

|  | Unit | Example 23 | Example 24 | Example 25 | Example 26 | Example 27 | Example 28 |
|---|---|---|---|---|---|---|---|
| Resin composition | — | X-23 | X-24 | X-25 | X-26 | X-27 | X-28 |
| Low-temperature impact strength | kJ/m$^2$ | 130 | 159 | 199 | 168 | 162 | 175 |
| Light transmittance | % | 42 | 41 | 40 | 55 | 41 | 44 |

TABLE 16

|  | Unit | Comparative Example 22 | Comparative Example 23 | Comparative Example 24 |
|---|---|---|---|---|
| Resin composition | — | Y-21 | Y-22 | Y-23 |
| Low-temperature impact strength | kJ/m$^2$ | 205 | 57 | 66 |
| Light transmittance | % | 35 | 38 | 9 |

Examples 29 to 35 and Comparative Examples 25 to 31

Using the resin composition as identified in Table 17 or 18, a film and a medical container were produced in the same manner as in Example 13 and evaluated. The results are shown in Tables 19 and 20.

TABLE 17

|  |  | X-29 | X-30 | X-31 | X-32 | X-33 |
|---|---|---|---|---|---|---|
| Cyclic polyolefin (A) | Resin No. | (A)-1 | (A)-1 | (A)-1 | (A)-2 | (A)-3 |
| High density polyethylene (C) | Resin No. | (C)-2 | (C)-2 | (C)-2 | (C)-2 | (C)-2 |
|  | Density | 945 | 945 | 945 | 945 | 945 |
|  | MFR | 3.0 | 3.0 | 3.0 | 3.0 | 3.0 |
| Composition (A)/(C) | Parts by weight | 40/60 | 30/70 | 20/80 | 40/60 | 40/60 |

TABLE 18

|  |  | Y-25 | Y-26 | Y-27 | Y-28 | Y-29 | Y-30 |
|---|---|---|---|---|---|---|---|
| Cyclic polyolefin (A) | Resin No. | (A)-1 | (A)-1 | (A)-1 | (A)-1 | (A)-1 | — |
| High density polyethylene (C) | Resin No. | (C)-2 | (C)-2 | — | — | — | (C)-2 |
|  | Density | 945 | 945 | — | — | — | 945 |
|  | MFR | 3.0 | 3.0 | — | — | — | 3.0 |
| Linear low density polyethylene (Q) | Resin No. | — | — | (Q)-1 | (Q)-1 | (Q)-1 | — |
|  | Density | — | — | 905 | 905 | 905 | — |
|  | MFR | — | — | 2.0 | 2.0 | 2.0 | — |
| Polypropylene (R) | Resin No. | — | — | — | — | — | (R)-1 |
|  | Density | — | — | — | — | — | 900.0 |
|  | MFR | — | — | — | — | — | 6.5 |
| Composition (A)/(C) | Parts by weight | 50/50 | 10/90 | 100/0 | 100/0 | 100/0 | 0/100 |
| Amount of (Q) | Parts by weight | 0 | 0 | 43 | 67 | 100 | 0 |
| Amount of (R) | Parts by weight | 0 | 0 | 0 | 0 | 0 | 25 |

TABLE 19

| | | | Unit | Example 29 | Example 30 | Example 31 | Example 32 | Example 33 | Example 34 | Example 35 |
|---|---|---|---|---|---|---|---|---|---|---|
| | Inner layer resin composition | | — | X-29 | X-30 | X-31 | X-32 | X-33 | X-26 | X-28 |
| Film physical properties | Light transmittance | Before sterilization | % | 83 | 83 | 83 | 83 | 87 | 84 | 84 |
| | | After sterilization | % | 75 | 74 | 73 | 75 | 78 | 76 | 73 |
| | Outer appearance after sterilization | | — | 4 | 4 | 4 | 4 | 4 | 4 | 4 |
| | Sealing stability after sterilization | | — | ○ | ○ | ○ | ○ | ○ | ○ | ○ |
| | Sealing strength after sterilization | | N/15 mm | 48 | 50 | 55 | 35 | 36 | 40 | 52 |
| | Sealing temperature width after sterilization | | °C. | 9 | 8 | 6 | 35 | 40 | 11 | 9 |

TABLE 20

| | | | Unit | Comp. Ex. 25 | Comp. Ex. 26 | Comp. Ex. 27 | Comp. Ex. 28 | Comp. Ex. 29 | Comp. Ex. 30 | Comp. Ex. 31 |
|---|---|---|---|---|---|---|---|---|---|---|
| | Inner layer resin composition | | — | Y-25 | Y-26 | Y-27 | Y-28 | Y-29 | Y-30 | (P)-1 |
| Film physical properties | Transparency | Before sterilization | % | 82 | 85 | 78 | 74 | 76 | 80 | 84 |
| | | After sterilization | % | 73 | 74 | 65 | 61 | 56 | 68 | 75 |
| | Outer appearance after sterilization | | — | 4 | 4 | 1 | 1 | 1 | 4 | 4 |
| | Sealing stability after sterilization | | — | ○ | ○ | —2) | —2) | —2) | ○ | ○ |
| | Sealing strength after sterilization | | N/15 mm | 15 | 60 | 40 | 51 | 50 | 58 | 65 |
| | Sealing temperature width after sterilization | | °C. | —1) | 4 | —3) | —3) | —3) | 10.0 | 5 |

1)In the measured heat sealing temperature region, the heat sealing strength did not reach 20 N/15 mm.
2)The sealed peripheries fused by sterilization, and the sealing stability could not be evaluated.
3)The sealed portions fused by sterilization and the heat sealing strength increased and as a result, a sample showing a strength of from 5 to 20 N/15 mm could not be obtained.

The present invention was described in detail with reference to specific embodiments. However, it is obvious for those skilled in the art that various changes and modifications are possible without departing from the intention and the scope of the present invention.

The invention claimed is:

1. A resin composition comprising from 5 to 95 parts by weight of a cyclic polyolefin (A) and from 5 to 95 parts by weight of an ethylene polymer (B) which satisfies the following requirements (a) to (d) (the total amount of (A) and (B) is 100 parts by weight):
   (a) the density as measured by density gradient tube method in accordance with JIS K6922-1 is from 930 to 960 kg/m$^3$;
   (b) the melt mass flow rate as measured in accordance with JIS K6922-1 at 190° C. under a load of 21.18 N is from 1 to 15 g/10 min;
   (c) in molecular weight measurement by gel permeation chromatography, two peaks are observed, and the ratio (Mw/Mn) of the weight average molecular weight (Mw) to the number average molecular weight (Mn) is within a range of from 3.0 to 7.0; and
   (d) a fraction having Mn of at least 100,000 as obtained by molecular weight fractionation, has at least 0.15 long-chain branches having at least 6 carbon atoms per 1,000 carbon atoms of the main chain.

2. The resin composition according to claim 1, which comprises from 10 to 90 parts by weight of the cyclic polyolefin resin (A) and from 10 to 90 parts by weight of the ethylene polymer (B).

3. The resin composition according to claim 1, which comprises from 20 to 40 parts by weight of the cyclic polyolefin (A) and from 60 to 80 parts by weight of the ethylene polymer (B).

4. The resin composition according to claim 1, wherein of the ethylene polymer (B), Mw/Mn is within a range of from 3.0 to 6.0, and Mn is at least 15,000.

5. The resin composition according to claim 1, wherein the proportion of a component having Mn of at least 100,000 as obtained by molecular weight fractionation of the ethylene polymer (B), is less than 40% of the entire ethylene polymer (B).

6. The resin composition according to claim 1, which further contains from 20 to 300 parts by weight of a high density polyethylene (C) which satisfies the following requirements (e) to (g) per 100 parts by weight of the cyclic polyolefin resin (A) and the ethylene polymer (B):
   (e) the density as measured by density gradient tube method in accordance with JIS K6922-1 is from 940 to 970 kg/m$^3$;
   (f) the melt mass flow rate as measured in accordance with JIS K6922-1 at 190° C. under a load of 21.18 N is from 0.1 to 15 g/10 min;

(g) a fraction having Mn of at least 100,000 as obtained by molecular weight fractionation has at most 0.14 long-chain branches having at least 6 carbon atoms per 1,000 carbon atoms of the main chain.

7. The resin composition according to claim 6, which contains from 80 to 150 parts by weight of the high density polyethylene (C) per 100 parts by weight of the cyclic polyolefin resin (A) and the ethylene polymer (B).

8. A resin composition comprising from 20 to 40 parts by weight of a cyclic polyolefin (A) and from 60 to 80 parts by weight of a high density polyethylene (C) which satisfies the following requirements (e) to (g) (the total amount of (A) and (C) is 100 parts by weight):
  (e) the density as measured by density gradient tube method in accordance with JIS K6922-1 is from 940 to 970 kg/m³;
  (f) the melt mass flow rate as measured in accordance with JIS K6922-1 at 190° C. under a load of 21.18 N is from 1 to 15 g/10 min;
  (g) a fraction having Mn of at least 100,000 as obtained by molecular weight fractionation has at most 0.14 long-chain branches having at least 6 carbon atoms per 1,000 carbon atoms of the main chain.

9. The resin composition according to claim 8, which comprises from 30 to 40 parts by weight of the cyclic polyolefin resin (A) and from 60 to 70 parts by weight of the high density polyethylene (C).

10. The resin composition according to claim 6, wherein of the high density polyethylene (C), Mw/Mn is within a range of from 2.0 to 3.5, and Mn is at least 25,000.

11. A film comprising the resin composition according to claim 1.

12. A film using the film as defined in claim 11 for a sealant layer.

* * * * *